No. 672,401. Patented Apr. 16, 1901.
R. AXEL.
BICYCLE SUPPORT.
(Application filed June 6, 1900.)
(No Model.)
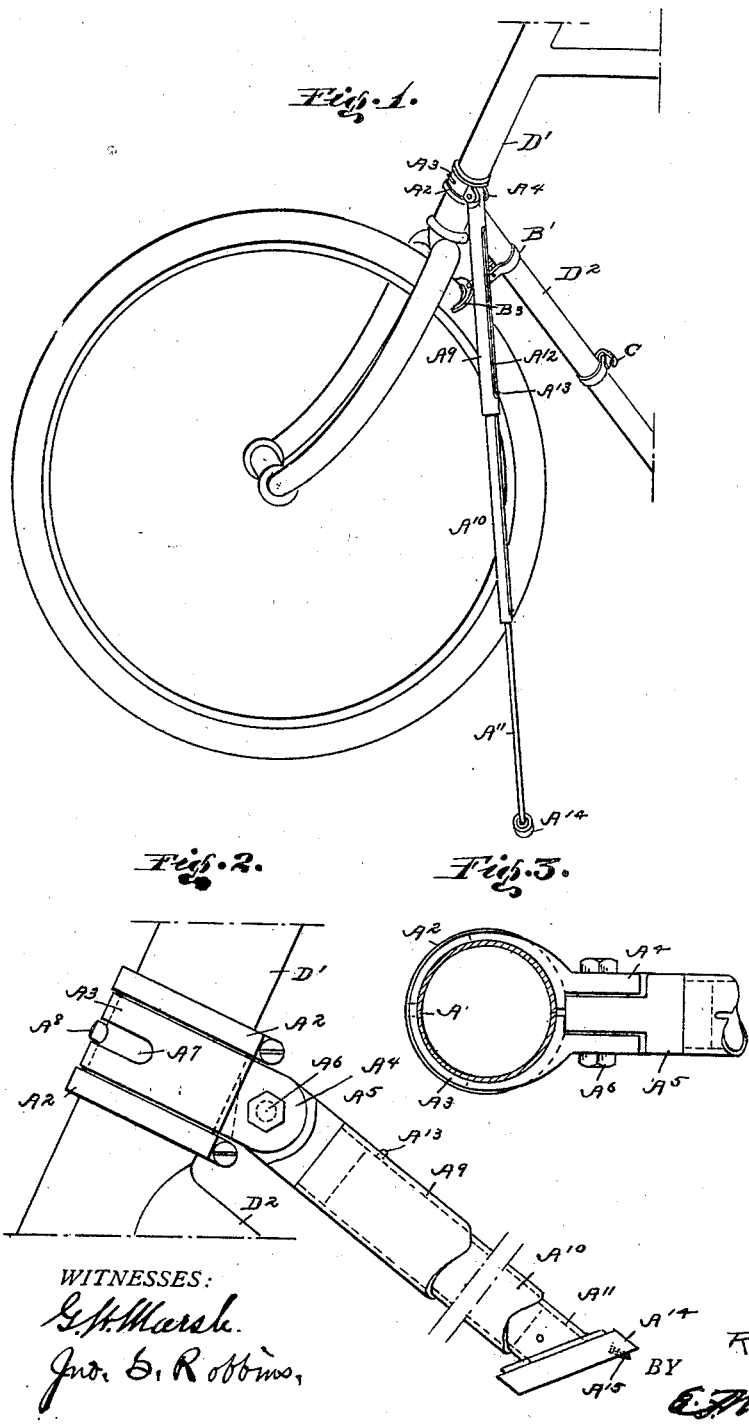
WITNESSES:
INVENTOR.
RUDOLPH AXEL.
BY
ATTORNEYS.

United States Patent Office.

RUDOLPH AXEL, OF SAN FRANCISCO, CALIFORNIA.

BICYCLE-SUPPORT.

SPECIFICATION forming part of Letters Patent No. 672,401, dated April 16, 1901.

Application filed June 6, 1900. Serial No. 19,325. (No model.)

*To all whom it may concern:*

Be it known that I, RUDOLPH AXEL, a citizen of the United States, residing at San Francisco, in the county of San Francisco and State of California, have invented a certain new and useful Improvement in Bicycle-Supports; and I do hereby declare the following to be a full, clear, and exact description of said invention, such as will enable others skilled in the art to which it most nearly appertains to make, use, and practice the same.

My invention relates to improvements in bicycle-props, my object being to provide a light, simple, and effective means of maintaining bicycles in an upright position when not being ridden.

In the drawings, Figure 1 is a perspective view, in operative position, of the invention as applied to the forward portion of a bicycle. Fig. 2 is a side elevation of the supporting mechanism attached to the head of a bicycle. Fig. 3 is a plan view from above of the movable collar and sleeve by means of which the extensible leg is attached to the head of the bicycle.

To facilitate the description, with reference to the accompanying drawings, the letter A will be applied to the supporting mechanism, the letter C to the retaining-clip for holding the supporting-leg in inoperative position, and the letter D to the bicycle parts. The coöperative minor parts of these several groups of mechanisms will be designated by the common letter strengthened by the addition of a numeral thereto.

In applying the supporter to a bicycle the sleeve $A'$ is attached to the head D of the bicycle at a point near the junction of the forward brace-rod $D^2$ by the clamping-flanges $A^2$, said flanges projecting laterally from the said sleeve and extending about the same. Loosely engaging the sleeve between the flanges $A^2$ is the collar $A^3$, having the lugs $A^4$ thereon, between which the head $A^5$ of the extensible leg is pivoted on the pin $A^6$. The slot $A^7$ in the collar $A^3$, acting with the pin $A^8$ on the sleeve $A'$, regulates the radial travel of the supporting-leg, and as said slot extends upon each side of the pin when the leg is in central inoperative position the leg can be projected upon either side of the bicycle, as desired.

The supporting-leg consists of the tube $A^9$, into the upper end of which the head $A^5$ is welded, the tube $A^{10}$ telescoping into tube $A^9$, and the tube $A^{11}$ telescoping into the tube $A^{10}$.

The collapsibility of the supporting-leg is regulated by bayonet connections between each tube—that is, the tube $A^9$ is provided with a longitudinal slot $A^{12}$, coöperating with the pin $A^{13}$ in head of tube $A^{10}$, which arrangement is repeated in the tubes $A^{10}$ and $A^{11}$, respectively.

Secured in the lower end of tube $A^{11}$ is the foot member $A^{14}$, formed of rubber or some substitute non-slipping material to rest upon the ground. The metal point $A^{15}$ is added as a precautionary measure. On slippery wet pavements rubber will not hold; but a crack or small depression is sufficient to hold the point $A^{15}$.

In operation, the supporting-leg being disengaged from the clip C, it is extended, rotated on the sleeve $A'$ against the stop $A^7$, and braced against the ground. It is evident the bicycle is now standing on a tripod formed by the supporting-leg and front and rear wheels of the bicycle. The collar $A^3$ being lodged against the pin $A^7$ maintains its position radially from the head of the bicycle. The leg is maintained in its radial position with reference to its pivot $A^6$ by the engagement of the head $A^5$ with the collar. The radiation of the said leg is limited in its outward extension only, thus permitting the placing of the foot $A^{14}$ on the ground as near as desired to the front wheel, an advantage where space is limited.

Preferably a wheel-lock, as $B^3$, suitably supported upon the frame, as by the clip $B'$, is used in conjunction with the present prop.

I recognize the possibility of applying my device differently to the frame of the bicycle, such as locking the rear wheel and applying the supporting-leg to upright brace between the saddle-post and crank-hanger of the bicycle-frame. Also certain mechanical changes might be made in the construction of the posts without interfering with the spirit of this invention.

Having thus described this invention, what is claimed is—

1. The combination with a tube of a bicycle-frame, having a pin extending therefrom, of a collar fitting upon said tube and having a slot through which the said pin projects, and a supporting-leg upon said collar, the end walls of said slot forming abutments against which said pin bears to limit the movement of said collar to hold said leg in supporting position, substantially as described.

2. The combination with the head-tube of a bicycle-frame, of a sleeve clamped about the same, laterally-extending flanges about said sleeve, a pin extending from said sleeve intermediate said flanges, a collar about said sleeve between said flanges and provided with a slot into which said pin projects, said slot extending to each side of the pin when the said collar is in central, inoperative position, lugs upon the ends of said collar, and a supporting-leg pivoted between said lugs, the head of said leg being adapted to engage said collar when the said leg is fully extended; substantially as described.

In testimony whereof I have hereunto set my hand this 28th day of May, 1900.

RUDOLPH AXEL.

Witnesses:
 BALDWIN VALE,
 G. W. MARSH.